US011199479B2

(12) United States Patent
Ando et al.

(10) Patent No.: US 11,199,479 B2
(45) Date of Patent: Dec. 14, 2021

(54) DISPENSING DEVICE AND DISPENSING METHOD

(71) Applicant: HITACHI, LTD., Tokyo (JP)

(72) Inventors: Takahiro Ando, Tokyo (JP); Masaaki Hirano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 43 days.

(21) Appl. No.: 16/331,642

(22) PCT Filed: Oct. 10, 2017

(86) PCT No.: PCT/JP2017/036658
§ 371 (c)(1),
(2) Date: Mar. 8, 2019

(87) PCT Pub. No.: WO2018/110052
PCT Pub. Date: Jun. 21, 2018

(65) Prior Publication Data
US 2019/0360898 A1 Nov. 28, 2019

(30) Foreign Application Priority Data

Dec. 13, 2016 (JP) .............................. JP2016-241490

(51) Int. Cl.
*G01N 1/14* (2006.01)
*B01L 3/02* (2006.01)

(52) U.S. Cl.
CPC ............... *G01N 1/14* (2013.01); *B01L 3/022* (2013.01); *B01L 3/0217* (2013.01); *B01L 3/0227* (2013.01); *B01L 3/0275* (2013.01); *G01N 2001/1427* (2013.01)

(58) Field of Classification Search
CPC .. G01N 1/14; G01N 2001/1427; B01L 3/022; B01L 3/0237; B01L 3/0217; B01L 3/0227
See application file for complete search history.

(56) References Cited

U.S. PATENT DOCUMENTS 4,178,803 A * 12/1979 Lee ..................... B01L 3/0224
141/27
2009/0191097 A1 7/2009 Hanafusa et al.
2010/0236324 A1 9/2010 Tajima et al.
(Continued)

FOREIGN PATENT DOCUMENTS

| JP | 62-184361 A | 8/1987 |
|---|---|---|
| JP | 02-77652 A | 3/1990 |
| JP | 07-43369 A | 2/1995 |

(Continued)

OTHER PUBLICATIONS

International Search Report of PCT/JP2017/036658 dated Jan. 16, 2018.

*Primary Examiner* — Paul M. West
(74) *Attorney, Agent, or Firm* — Mattingly & Malur, PC

(57) ABSTRACT

An object of the present invention is to provide a dispensing device that can inhibit a dead volume from occurring and can dispense a liquid of a small quantity with a high degree of accuracy while reducing the variation of dispensing quantities. A dispensing device according to the present invention has a detachable dispensing tip and the dispensing tip has a configuration of arranging a plunger in a hollow part of a metal pipe (refer to FIG. 2).

8 Claims, 7 Drawing Sheets

(56) References Cited

U.S. PATENT DOCUMENTS

2012/0196374 A1    8/2012  Haga
2017/0001190 A1*   1/2017  Ito .......................... C12M 33/04

FOREIGN PATENT DOCUMENTS

| JP | 2006-250832 A | 9/2006 |
| JP | 5295069 B2 | 9/2013 |
| WO | 2007/139056 A1 | 12/2007 |
| WO | 2008/156113 A1 | 12/2008 |
| WO | 2015/079477 A | 6/2015 |

* cited by examiner

DISPENSING DEVICE AND DISPENSING METHOD

TECHNICAL FIELD

The present invention relates to a dispensing device that dispenses a liquid sample.

BACKGROUND ART

In clinical examination to analyze protein, sugar, lipid, enzyme, hormone, inorganic ion, disease marker, and the like contained in a biological sample such as blood, urine, or the like, a dispensing device is used to dispense a liquid such as reagent, specimen, or the like into a sample storage container. In recent years, high sensitivity microanalysis of a biological sample is required due to the increase in number of measurement items in clinical examination. Reasons for such requirement include: (a) it is necessary to accurately measure as many items as possible from a biological sample of a limited quantity; and (b) analysis items have changed due to the accumulation of knowledge and the advancement of technologies, and then a material of a very small quantity is measured in many cases. As needs to analyze a sample of a small quantity with a high degree of sensitivity increase, the quantity of a liquid measured with a dispensing device have been reduced inevitably.

In conventional liquid dispensing in clinical examination, a dispensing probe that can be used repeatedly by washing is used. Improvement of dispensing accuracy is required in order to realize a highly accurate inspection. To that end, a dispensing method is usually adopted that fills the interior of a flow channel connected to a dispensing probe with extruding water, that sucks an excessive liquid in order to inhibit a sample to be dispensed from being influenced by dilution caused by the extruding water, and that discharges only a predetermined quantity (Patent Literature 1, for example). On the other hand, however, the method has many challenges such as (a) to be hardly adaptable to a biological sample of a small quantity by nature like a children specimen, (b) to have to reduce the physical burden of a patient when collecting samples, and (c) to have to avoid sucking a liquid of an excess quantity as far as possible in order to reduce reagent consumption.

The dispensing method of using extruding water described above can realize dispensing operation with high degree of accuracy and is suitable for dispensing a sample of 2 to 3 μL. On the other hand, however, such method is believed to be unsuitable for accurate diagnosis of a CV (Coefficient of Variation) of less than 1% because a CV increases when dispensing a sample of less than 2 to 3 μL. For example, a total quantity of one-time blood collection in the case of using a lancet for blood draw is about several μL and a highly-accurate dispensing method for a small quantity of at least less than 1 μL comes to be necessary in order to implement clinical examination of multi-item in such a blood sampling quantity.

As highly-accurate dispensing methods for a liquid of a trifle quantity of 1 μL or less, an ultrasonic method, a piezo method, and a tip method are known. The outlines of those methods are explained hereunder.

The ultrasonic method is a method of dispensing a liquid by giving ultrasonic vibration individually to each well in a plate containing the liquid using an ultrasonic head, scattering fine droplets of a μL level to an nL level from the interior of the well, and attaching the scattered droplets to the interior of a well in another plate arranged oppositely. If physical properties such as the acoustic characteristics and the viscosity of a liquid are known, the quantity of the scattered liquid can be controlled precisely and hence a liquid of 1 μL or less can be dispensed with a high degree of accuracy. Further, an ultrasonic head is completely non-contact with a liquid and has the advantage that cross contamination between samples is not caused. However, unless a liquid of a predetermined quantity (about 5 μL) or more exists in a well in a plate containing the liquid, droplets cannot be scattered with a high degree of accuracy by giving ultrasonic vibration and the liquid can hardly be made full use of (in other words, a dead volume cannot be zero). A problem concerned therefore is that it is impossible to execute clinical examination by dispensing the whole quantity of a sample even with a rare biological sample and nearly half of a sample is not used in some cases.

The piezo method is a method of bringing a piezo element into contact with a deformable fine flow channel, and discharging fine droplets by varying a flow channel volume by applied voltage. Since a voltage applied to a piezo element can be controlled rapidly and precisely, a variable flow channel volume (this corresponds to a dispensing quantity) can be controlled strictly and the piezo method is used as a method of discharging a liquid of a predetermined quantity with a high degree of accuracy like an ink jet printer for example. A problem however is that clogging of a discharge nozzle caused by the agglutination of a material contained in droplets or the variation of the dispensing quantities caused by a liquid remaining on the inner wall of a discharge port tip cannot be ignored. In the case of a liquid of 1 μL or less in particular, since the state of a discharge port is required to be controlled to a high degree, it is assumed in reality that the variation of discharging quantities can hardly be controlled within a CV of about 3%.

The tip method is a method of configuring the tip part of a dispensing head as an exchangeable dispensing tip. The tip method is used for a micropipette used frequently in bio-related research for example. The tip method allows a dispensing tip to be exchanged as necessary and hence has the advantage that a heterogeneous sample can be prevented from being mixed during dispensing. A problem arising in the case of dispensing a liquid with a high degree of accuracy of 1 μL or less in the tip method is the miniaturized amount of a dispensing tip volume and the inhibition of air pressure variation in the interior of a dispensing tip. A resin has heretofore been used as a material of a dispensing tip in order to reduce manufacturing cost and the processing accuracy is limited to about tens of μm. For that reason, the processing accuracy, together with the miniaturized amount of a dispensing tip volume, increases the error of a dispensing quantity undesirably. For example, when a pipette is operated accurately (here, shifted by 0.26 mm in the vertical direction) with the aim of a discharge quantity of 0.1 μL by using a columnar dispensing tip 0.7 mm in inner diameter, the CV value of the dispensing quantity is as large as 4.6% at a rough estimate undesirably even though processing accuracy is suppressed to 30 μm. Further, since a liquid is sucked or discharged by controlling an air pressure in the interior of a dispensing tip with a pump mechanism, it sometimes happens that the liquid does not follow the operation of a pump during sucking or discharging because of the influence of the compressibility of the air in the interior of the dispensing tip and it is difficult to control a dispensing quantity with a high degree of accuracy.

Since the influence of an air pressure in the interior of a dispensing tip comes to be conspicuous as the viscosity of a liquid increases, a resin-made dispensing tip (positive displacement system) not having an air layer is used as a disposable tip in recent years. As stated earlier however, the processing accuracy of a resin-made dispensing tip is limited. Even when the influence of an air pressure is removed by using a dispensing tip of a positive displacement system therefore, it is possible to dispense a liquid accurately only in the case where a liquid quantity is about 1 μL or more.

CITATION LIST

Patent Literature

Patent Literature 1: Japanese Patent No. 5295069

SUMMARY OF INVENTION

Technical Problem

The present invention is established in view of the above problems and an object of the present invention is to provide a dispensing device that can inhibit a dead volume from occurring and can dispense a liquid of a small quantity with a high degree of accuracy while reducing the variation of dispensing quantities.

Solution to Problem

A dispensing device according to the present invention has a detachable dispensing tip configured so as to arrange a plunger in a hollow part of a metal pipe.

Advantageous Effects of Invention

A dispensing device according to the present invention makes it possible to: dispense a liquid of a small quantity with a high degree of accuracy; and inhibit a dead volume from occurring when a liquid sample of a small quantity is dispensed. As a result, clinical examination can be executed accurately by using a biological sample of a small quantity.

DESCRIPTION OF EMBODIMENTS

Figure 1:
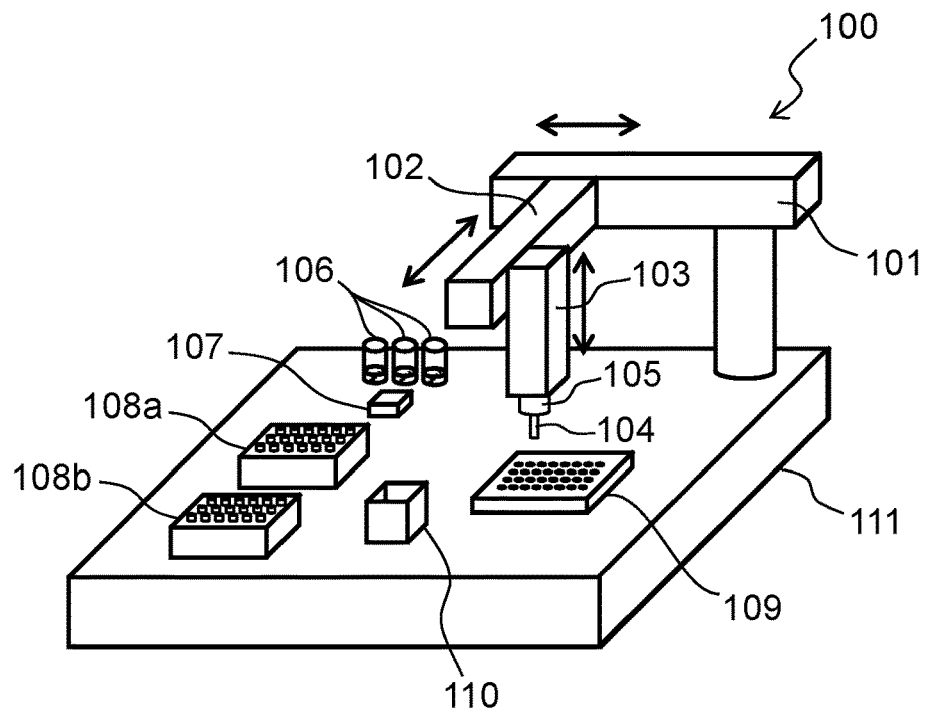
FIG. 1 is a schematic diagram showing an overall configuration of a dispensing device 100.

FIG. 1 is a schematic diagram showing an overall configuration of a dispensing device 100 according to an embodiment of the present invention. The dispensing device 100 has a base stage 111 formed by a rigid body member. Over the base stage 111, liquid sample containers 106, a liquid sample observing device 107, a pre-use dispensing tip storage container 108 (108a and 108b in the figure), an inspection implementation container 109, and a post-use dispensing tip storage container 110 are provided.

Each of the liquid sample containers 106 contains a biological sample such as blood or urine or a reagent. The liquid sample observing device 107 is a device for observing the states such as the volume, the color, and others of a liquid in the liquid sample container 106. Each of the liquid sample containers 106 may have a temperature control function to adjust the temperature of a liquid (for example, to keep a predetermined temperature) contained in the interior of the liquid sample containers 106.

The pre-use dispensing tip storage container 108 is a container to contain pre-use dispensing tips 104 in line. The inspection implementation container 109 has many wells into each of which a liquid sample, i.e. a dispensing target, of a predetermined quantity is supplied by dispensing. The inspection implementation container 109 also may have a temperature control function to adjust the temperature of a liquid (for example, to keep a predetermined temperature) contained in the interior of the inspection implementation container 109. The post-use dispensing tip storage container 110 is a container to contain an unnecessary liquid remaining in a dispensing tip 104 and to contain a dispensing tip 104 that has been used for dispensing processing.

The dispensing device 100 further has a dispensing head 105 to which a dispensing tip 104 for dispensing processing is attached. The dispensing device 100 further has an X-axis direction drive part 101, a Y-axis direction drive part 102, and a Z-axis direction drive part 103, those drive parts being arranged for moving a dispensing head 105 to an arbitrary position over the base stage 111. Dispensing processing is executed by sucking a liquid in a liquid sample container 106 by a dispensing tip 104 detachably mounted at the lower end of the dispensing head 105, and by discharging the liquid into the inspection implementation container 109.

Figure 2:
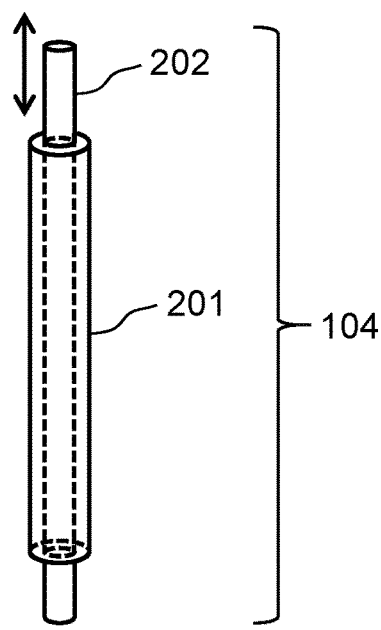
FIG. 2 is a schematic diagram of a dispensing tip 104.

FIG. 2 is a schematic diagram of a dispensing tip 104. The dispensing tip 104 is a single-use (disposable) part that is replaced every time of dispensing processing. The dispensing tip 104 has a metal pipe 201 and a plunger 202. The metal pipe 201 has a hollow part through which a liquid sample passes. The plunger 202 is arranged slidably in the hollow part and functions as a piston to touch the liquid sample and discharge or suck the liquid sample. By the plunger 202 touching the liquid sample and sucking or discharging the liquid sample, the dispensing tip 104 functions as a dispensing tip of a positive displacement system (in other words, an air layer does not exist between the plunger 202 and the liquid sample).

Because the pipe having a hollow part is made of metal, the pipe has the advantages that the pipe does not deform even when it touches the inspection implementation container 109 and a tip angle is likely to be machined and adjusted with a high degree of accuracy.

If the inner diameter of the hollow part of the metal pipe 201 varies, that causes the dispensing accuracy to deteriorate. In the present embodiment therefore, the metal pipe 201 is configured so as to be formed by a metal material that can improve the processing accuracy of an inner diameter. As a processing method capable of improving the processing accuracy of the inner diameter of a metal pipe 201, electroforming that will be described later is named for example.

Firstly, a wire is immersed into an electrolyte in an electrolytic bath and a metal is cast over the surface of the wire by electric current control. As a metal constituting the main component of an electrolyte, nickel or an alloy of nickel, iron or an alloy of iron, copper or an alloy of copper, cobalt or an alloy of cobalt, a tungsten alloy, or a fine particle dispersed metal can be used for example. A metal pipe 201 can be manufactured by casting a metal over the surface of a wire and then extracting the wire. As a method of facilitating the extraction of a wire, a method can be used such as: (a) coating a wire with an oxide film beforehand, (b) coating a wire with a surfactant beforehand, or (c) giving a large difference in material characteristics between a core wire and a cast material. As a material of a wire, an electrically conductive stainless steel or phosphor bronze can be used for example.

As a plunger 202, a wire used in the manufacturing process of a metal pipe 201 or a wire having a shape equivalent to the wire can be used. A wire having an outer diameter about 1 to 10 μm smaller than the inner diameter of a metal pipe 201 is preferably selected as a plunger 202 in consideration of the inner diameter processing accuracy of the metal pipe 201 and the slidableness of a dispensing tip 104. As the material of a plunger 202, the same stainless steel as a wire or the like can be named for example. A material having stiffness different from a metal pipe 201 can execute dispensing operation with a high degree of slidableness and hence such a material is preferably used. A plunger 202 has to be longer than a metal pipe 201 and is desirably longer by about 10 to 20 mm.

When the inner diameter of a metal pipe 201 (namely, the outer diameter of a wire) is large, a dispensing quantity varies largely even by a slight error in moving distance of a plunger 202. Therefore, in order to dispense a liquid sample of a very small quantity with a high degree of accuracy, it is desirable for a metal pipe 201 to have a smaller inner diameter. As it will be described later, when a liquid sample of 1 μL or less is dispensed, a desirable inner diameter is in the range of 0.5 to 3.0 mm.

A wall thickness of a metal pipe 201 is desirably 5 μm or more from the viewpoint of strength. Further, a wall thickness is desirably 5 mm or less in consideration of time required for electroforming process. A wall thickness is more desirably in the range of 50 to 200 μm.

Figure 3:
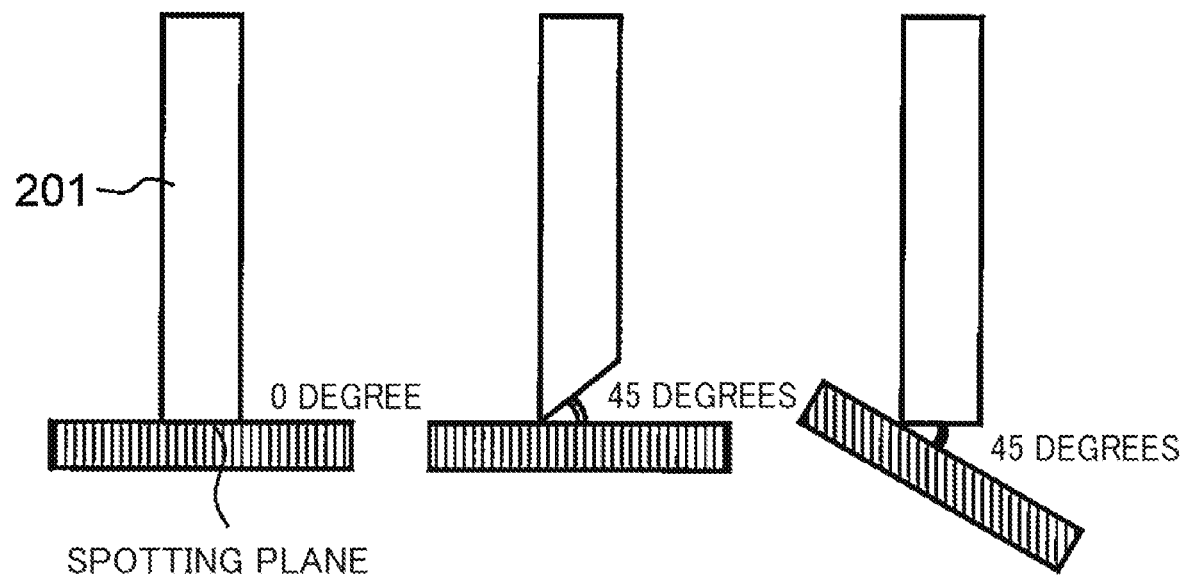
FIG. 3 comprises side views showing the states in which a metal pipe 201 touches a well bottom surface (spotting plane) in an inspection implementation container 109.

FIG. 3 comprises side views showing the states in which a metal pipe 201 touches a well bottom surface (spotting plane) in an inspection implementation container 109. The lower end surface of a metal pipe 201 is desirably not parallel with a spotting plane but oblique to some extent. The reason is as follows.

The left view of FIG. 3 shows a case where the lower end surface of a metal pipe 201 is parallel with a spotting plane. When you intend to discharge a liquid in the state in which the lower end surface of a metal pipe 201 touches a spotting plane, an exit of the liquid does not exist and the liquid is in such a state as being crushed and the liquid may possibly not be discharged accurately.

The center view of FIG. 3 shows a case where the lower end surface of a metal pipe 201 inclines to a spotting plane at an angle of 45 degrees. When you intend to discharge a liquid in the state in which the tip of a metal pipe 201 touches a spotting plane, the liquid can go out from the metal pipe 201 through a space caused by the inclination. Such an inconvenience as seen in the left view of FIG. 3 therefore does not occur.

Such an inclination: may be any inclination as long as the inclination is formed relatively between the lower end surface of a metal pipe 201 and a spotting plane; and may also be configured so that a spotting plane inclines as shown in the right view of FIG. 3 for example. Any inclination is acceptable as long as the inclination is larger than 0 degree and the inclination is desirably about 45 degrees or less, or more desirably about 22.5 degrees or less.

Figure 4:
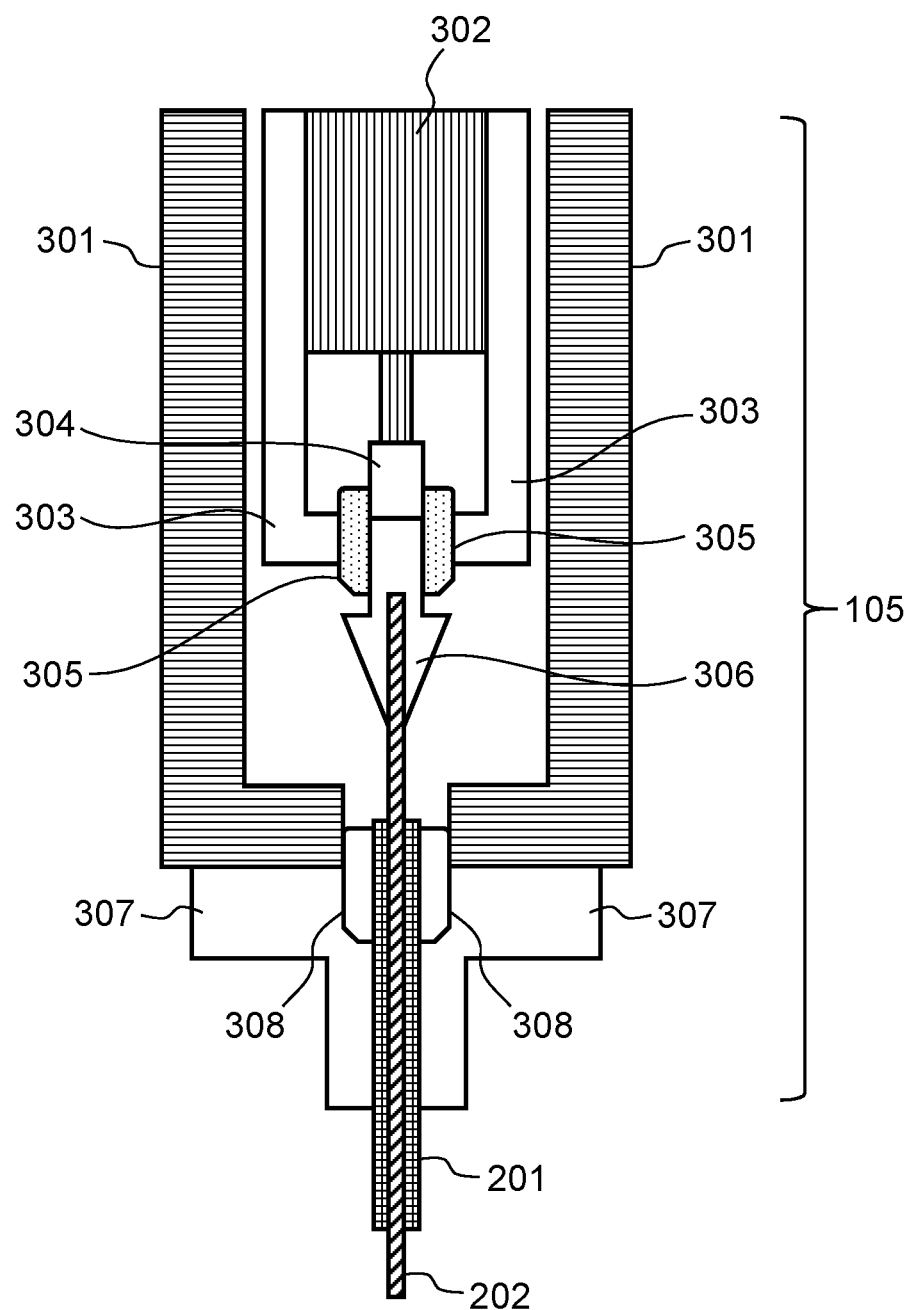
FIG. 4 is a sectional side view showing a configuration of a dispensing head 105.

FIG. 4 is a sectional side view showing a configuration of a dispensing head 105. The dispensing head 105 has a part to which a metal pipe 201 and a plunger 202 are attached and a drive part for moving the plunger 202 vertically. The drive part has a plunger drive mechanism 302, a plunger drive mechanism exterior part 303, a plunger drive mechanism connector 304, a plunger fastener mounting part 305, and a plunger fastener 306. The drive mechanism is surrounded by a dispensing head exterior part 301 from the viewpoint of safety. The plunger drive mechanism 302 is an actuator. An example of such actuator includes a solenoid or a servomotor.

The metal pipe 201 protrudes outside the dispensing head 105 by a predetermined length and is fixed by a metal pipe fastener 308. The positions of the metal pipe 201 and the plunger 202 are corrected by a metal pipe position correction tool 307 so as to be concentric. As the metal pipe fastener 308, a screw-type fastener is used for example in order to conform to metal pipes 201 of various outer diameters.

A protrusion length of the plunger 202 is decided by the plunger fastener 306, an end of the plunger 202 is fixed, the position is further fixed by the plunger fastener mounting part 305, and the plunger 202 is connected to the plunger drive mechanism 302 through the plunger drive mechanism connector 304. In order to keep the coaxiality of the plunger drive mechanism 302 and the plunger 202, the plunger drive mechanism exterior part 303 connected to the plunger fastener mounting part 305 is arranged. As a plunger fastener 306 conforming to plungers 202 of various outer diameters, a fastener that can be fixed by a screw-type plunger fastener mounting part 305 and can adjust the outer diameter is used for example.

Figure 5:
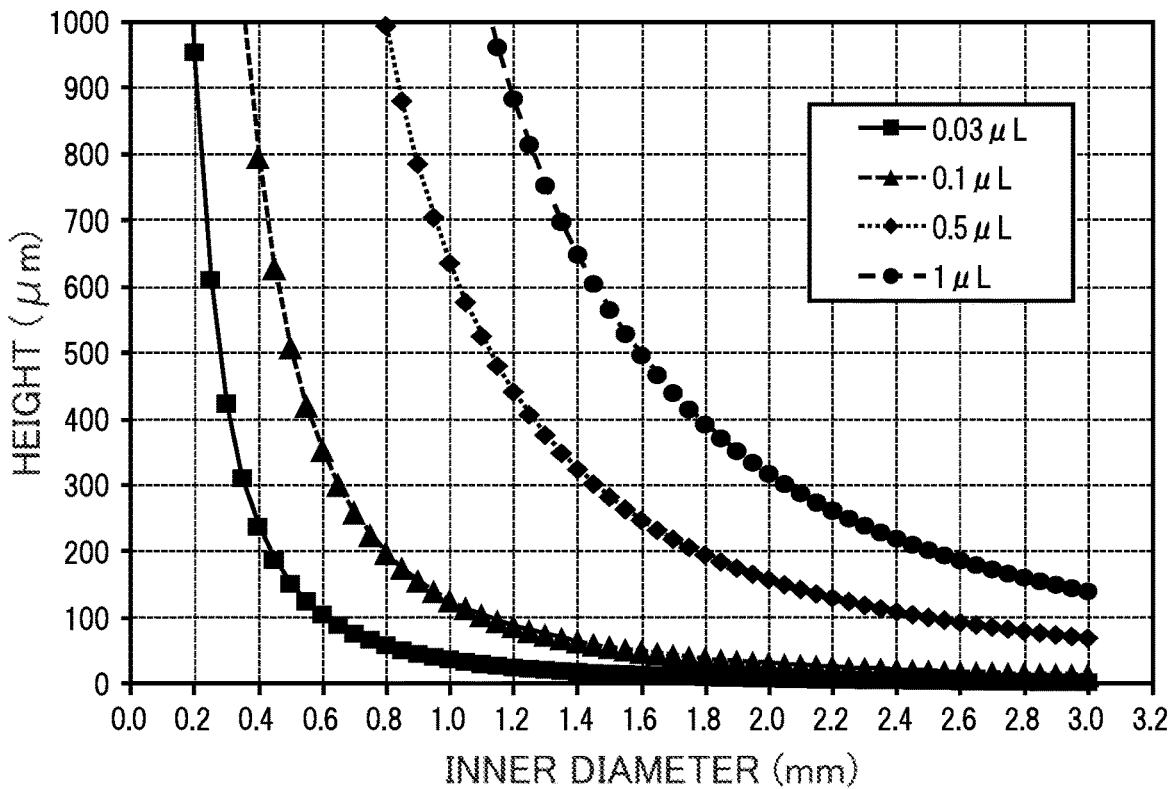
FIG. 5 is a graph showing relationships between an inner diameter of a metal pipe 201 and a moving length of a plunger 202 when dispensing quantities are 0.03 μL, 0.1 μL, 0.5 μL, and 1 μL.

FIG. 5 is a graph showing relationships between an inner diameter of a metal pipe 201 and a moving length of a plunger 202 when dispensing quantities are 0.03 μL, 0.1 μL, 0.5 μL, and 1 μL. A moving length of a plunger 202 increases as an inner diameter of a metal pipe 201 reduces and a moving length of the plunger 202 reduces as the inner diameter increases. When a moving length of a plunger 202 is short, a plunger drive mechanism 302 has to be controlled accurately in the range of the short moving length in order to secure a dispensing quantity. An inner diameter of a metal pipe 201 therefore has to be selected in conformity with the accuracy (resolution) of a plunger drive mechanism 302.

In the case where the resolution of a plunger drive mechanism 302 is about tens of μm for example, a dispensing quantity of 0.1 μL or smaller is targeted desirably when the inner diameter is about 1 mm or less and a dispensing quantity of 0.1 μL or larger is targeted desirably when the inner diameter is about 1 mm or more. When the resolution of a plunger drive mechanism 302 is 1 μm or less, a targeted dispensing quantity of 0.03 to 1 μL can be dispensed with a high degree of accuracy. Meanwhile, when an inner diameter is about 1 mm or less, a dispensing tip 104 has to be selected while attention is paid to the fact that a moving length of a plunger 202 increases abruptly. In other words, it is desirable that a dispensing tip 104 having a different shape can be selected appropriately in accordance with requested suction quantity and discharge quantity of a liquid.

According to the example shown in FIG. 5, it is obvious that, when a liquid sample of 1 μL or less is dispensed, a desirable inner diameter of a metal pipe 201 is in the range of about 0.5 to 3.0 mm. The reason is that, as long as an inner diameter is within this range, a desired dispensing quantity is achieved as long as the plunger 202 is moved by a resolution of about 0.1 µm or more.

When an inner diameter of a metal pipe 201 is within the range of about 0.5 to 3.0 mm, a moving length of a plunger 202 is within the range of 0.1 to 1,000 µm as shown in FIG. 5. Therefore, when moving the plunger 202 from a downmost position to an uppermost position, the plunger drive mechanism 302 and its peripheral members have to be configured so as to be movable within the range. The position where a plunger 202 is pushed downmost means the position where the tip surface of the plunger 202 reaches the tip surface of a metal pipe 201 (or, a position where the tip surface of a plunger 202 protrudes to some extent). The position where a plunger 202 is pushed uppermost means the position where a liquid sample of a desired quantity is sucked.

A pre-use dispensing tip storage container 108, as shown in FIG. 1 for example, has (a) a pre-use dispensing tip storage container 108a storing dispensing tips 104 of large sizes used when liquids of relatively large volumes are dispensed and (b) a pre-use dispensing tip storage container 108b storing dispensing tips 104 of small sizes used when liquids of relatively small volumes are dispensed. It is desirable if a dispensing tip 104 of a desirable size may be selected. Three or more kinds of dispensing tips 104 may also be prepared.

Figure 6:
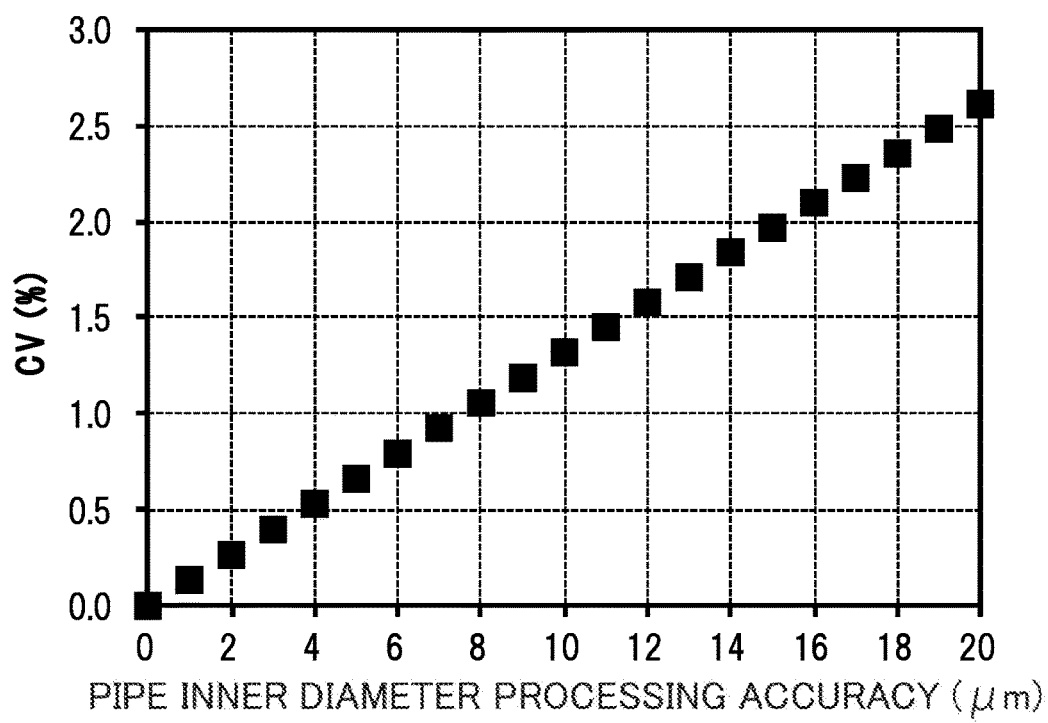
FIG. 6 is an example showing a relationship between an inner diameter processing accuracy of a metal pipe 201 and a variation (CV value) in the dispensing quantity of 0.1 μL.

FIG. 6 is an example showing a relationship between an inner diameter processing accuracy of a metal pipe 201 and a variation (CV value) in the dispensing quantity of 0.1 µL. In this example, it is assumed that an inner diameter of a metal pipe 201 is 0.5 mm and a plunger 202 is moved by 0.509 mm (fixed value) in order to discharge a dispensing quantity of 0.1 µL. An extent of the influence of a deviation of the inner diameter processing accuracy of a metal pipe 201 on a deviation of a dispensing quantity is calculated. The graph in FIG. 6 shows the calculated result. The average value of dispensing quantities is set at 0.1 µL, the deviation of the dispensing quantities calculated from the deviation of the inner diameter processing accuracy is assumed to be 3σ, and an average deviation σ/an average value is defined as a CV value.

As shown in FIG. 6, it is obvious that an inner diameter processing accuracy is desirably about 7 µm or less in order to reduce the variation in the dispensing quantity of 0.1 µL within a CV of less than 1%. It is further obvious that, when a range of a dispensing quantity is regarded as the range of 0.03 to 1 µL, the inner diameter processing accuracy (variation in the inner diameter) is desirably 5 µm or less.

Figure 7:
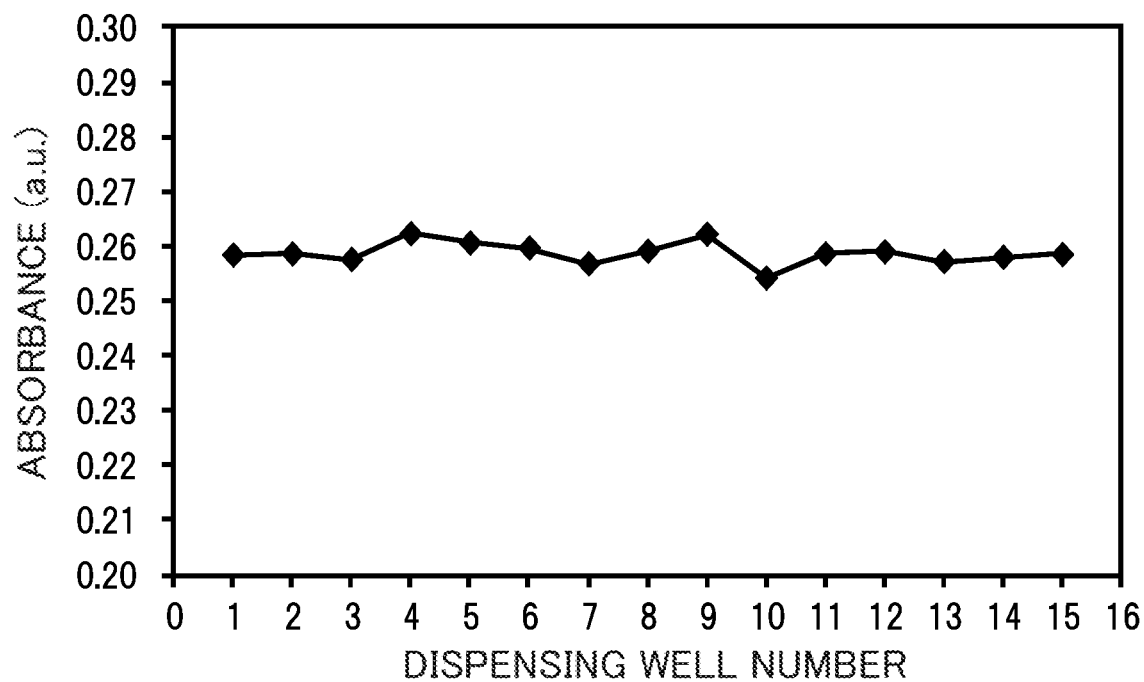
FIG. 7 is a graph showing the variation of the dispensing quantities when liquids of 0.1 μL each are actually dispensed into respective wells in a 96-well microplate.

FIG. 7 is a graph showing the variation of the dispensing quantities when liquids of 0.1 µL each are actually dispensed into respective wells in a 96-well microplate. As the liquid sample, a 1,000 abs Orange G aqueous solution is used and the aqueous solution of 1.8 µL is sucked and dispensed into 0.1 µL each by a dispensing tip of the conditions described below. After the dispensing, 200 µL of ultra-pure water is dispensed into the respective wells by using a dispensing pipette that can dispense a 200 µL solution at a CV of less than 1% and, after the solution is stirred, the absorbance in a wavelength of 492 nm is measured with an absorbance microplate reader (Infinite 200 Pro) made by TECAN.

[Dispensing Tip]

Metal pipe 201: gold-plated nickel, inner diameter 0.50 mm, wall thickness 50 µm, total length 40 mm Plunger 202: stainless steel, outer diameter 0.495 mm, total length 50 mm As the result shown in FIG. 7, the CV representing the variation of the dispensing quantities is 0.79% (number of samples N=15) and it is shown that a liquid sample of 0.1 µL can be dispensed with a high degree of accuracy of a CV of less than 1%.

Figure 8:
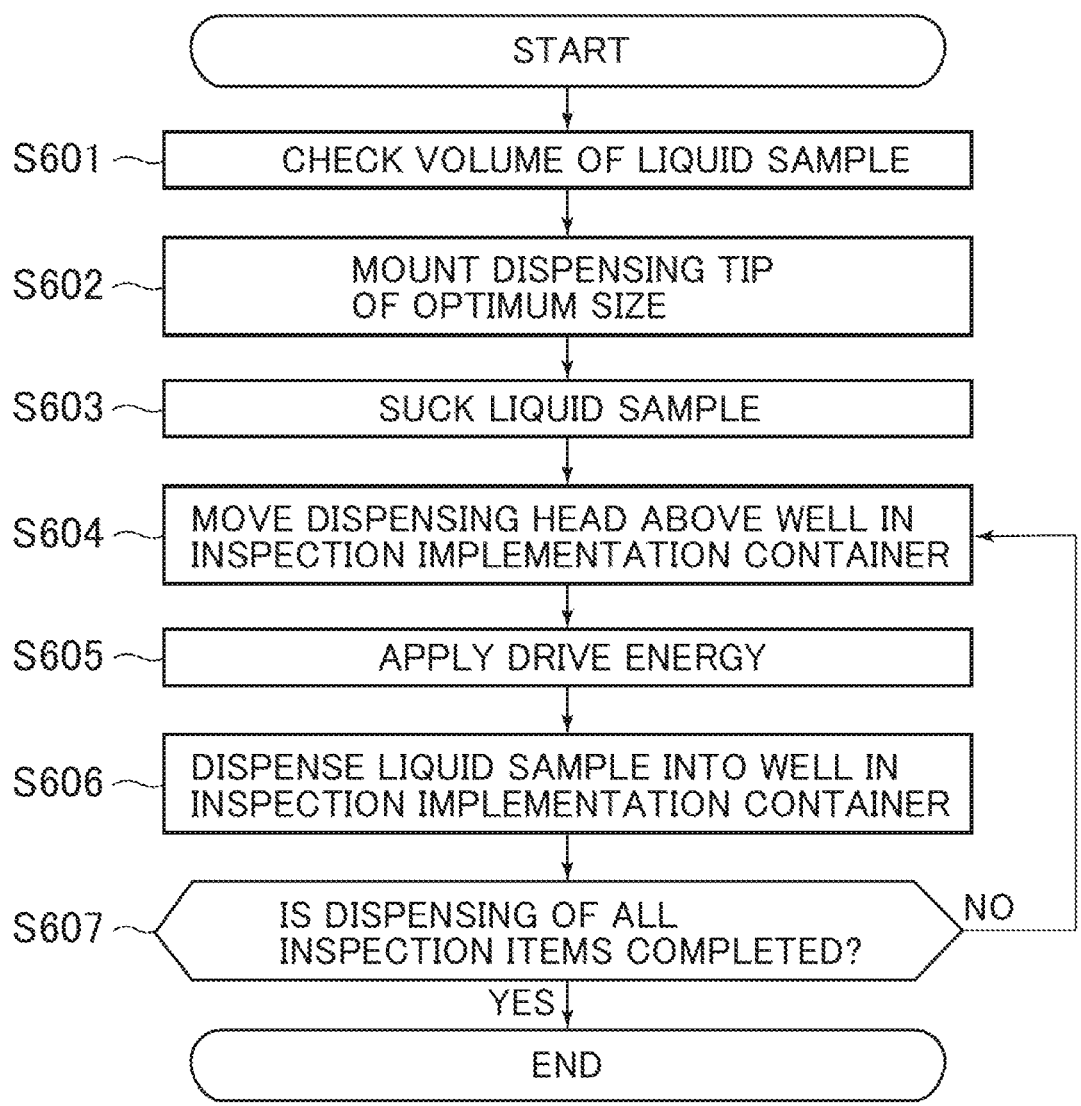
FIG. 8 is a flowchart showing an example of a method of dispensing a liquid sample by using a dispensing device 100.

FIG. 8 is a flowchart showing an example of a method of dispensing a liquid sample by using a dispensing device 100. A user selects a dispensing tip 104 in accordance with a dispensing quantity and checks a liquid volume with a liquid sample observing device 107 at S601. A dispensing tip 104 of an optimum size is mounted at S602 and sucks a liquid at S603. A dispensing head 105 is shifted above an inspection implementation container 109 at S604 and a plunger 202 is driven by a predetermined length with a plunger drive mechanism 302 at S605. The liquid is dispensed into wells in the inspection implementation container 109 at S606. The completion of the dispensing corresponding to the number of inspection items is confirmed at S607 and the dispensing is finished when the dispensing is completed. When the dispensing is not completed, the operations of S604 to S606 are repeated.

Figure 9:
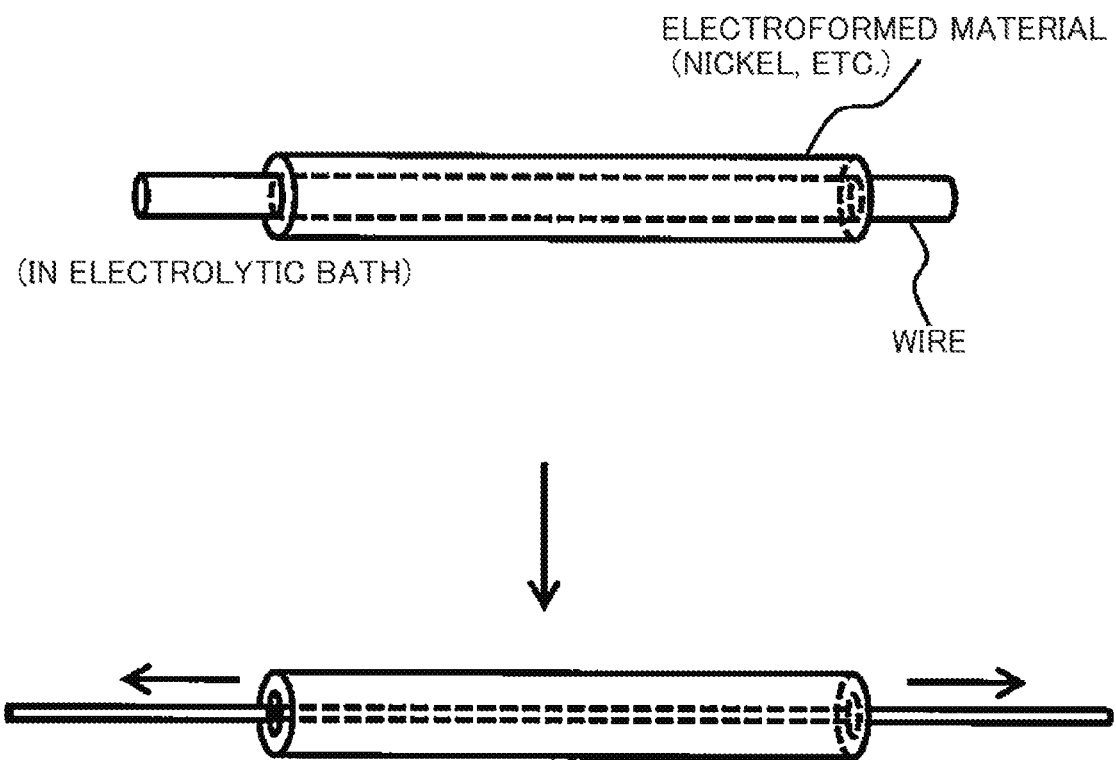
FIG. 9 is a view showing process of manufacturing a metal pipe 201.

FIG. 9 is a view showing process of manufacturing a metal pipe 201. A pipe diameter can be controlled by adjusting an applied voltage. A metal pipe 201 can be manufactured by extending a wire after a metal is cast over the surface of the wire.

Summary of Present Embodiment

A dispensing device 100 according to the present embodiment executes dispensing by a positive displacement system by using a dispensing tip 104 to suck or discharge a liquid sample through a hollow part of a metal pipe 201. As a result, an air layer is not interposed between a plunger 202 and the liquid sample and hence the variation of dispensing accuracy caused by air pressure variation can be inhibited. By using a dispensing device 100 according to the present embodiment, a liquid sample of a very small quantity of 1 µL or less for example can be dispensed with a high degree of accuracy of a CV value of 1% or less.

A dispensing device 100 according to the present embodiment is configured so as to be able to attach and detach a dispensing tip 104. As a result, contamination between samples can be inhibited. Further, a dispensing tip 104 having a different hollow part inner diameter or a different processing accuracy can be selected appropriately in accordance with a dispensing quantity and dispensing accuracy, which are needed.

With Regard to Modified Examples of Present Invention

The present invention is not limited to the aforementioned embodiment and includes various modified examples. For example, the aforementioned embodiment is explained in detail in order to explain the present invention in an easily comprehensible manner and the present invention is not necessarily limited to an embodiment having all of the explained configurations.

Although FIG. 1 shows an example of mounting a single dispensing head 105, when two or more dispensing heads 105 are arranged, dispensing operations can be applied simultaneously to two or more wells in an inspection implementation container 109.

Although the inner diameter of a metal pipe 201 is in the range of 0.5 to 3.0 mm and the moving length of a plunger 202 is in the range of 0.1 to 1,000 μm on the assumption that a liquid sample of 1 μL or less is dispensed in the aforementioned embodiment, those numerical values can also be changed appropriately in conformity with a dispensing quantity or dispensing accuracy.

Although an example of dispensing a liquid sample of a biological origin in clinical examination is explained in the aforementioned embodiment, drug discovery research, protein crystallization, and the like are conceivable as other applications of a dispensing device 100 for example.

REFERENCE SIGNS LIST

100 Dispensing device
101 X-axis direction drive part
102 Y-axis direction drive part
103 Z-axis direction drive part
104 Dispensing tip
105 Dispensing head
106 Liquid sample container
107 Liquid sample observing device
108 Pre-use dispensing tip storage container
109 Inspection implementation container
110 Post-use dispensing tip storage container
111 Base stage
201 Metal pipe
202 Plunger
301 Dispensing head exterior part
302 Plunger drive mechanism
303 Plunger drive mechanism exterior part
304 Plunger drive mechanism connector
305 Plunger fastener mounting part
306 Plunger fastener
307 Metal pipe position correction tool
308 Metal pipe fastener

The invention claimed is:

1. A dispensing device that dispenses a liquid sample, comprising:
    a metal pipe fastener;
    a dispensing tip that is detachably attached to the dispensing device, touches the liquid sample, and sucks or discharges the liquid sample; and
    a fixed plunger mount;
    wherein the dispensing tip comprises:
    a metal pipe that is formed by a metal material and has a hollow part through which the liquid sample passes;
    a plunger slidably arranged in the hollow part; and
    a screw-type plunger fastener fixed to one end of the plunger that is detachably attached to the fixed plunger mount,
    wherein the metal pipe is fixed by the metal pipe fastener, which is disposed between a distal end of the metal pipe and the screw-type plunger fastener in an axial direction of the plunger,
    wherein the metal pipe fastener is disposed around an outer surface of the metal pipe and has a diameter greater than the metal pipe,
    wherein the metal pipe has a uniform inner diameter and a uniform outer diameter, and
    wherein the plunger has a uniform diameter.

2. The dispensing device according to claim 1,
    wherein the metal pipe has a tip surface facing a bottom surface of a container that contains the liquid sample, and
    wherein the tip surface has an inclination of 0 to 45 degrees with respect to the bottom surface.

3. The dispensing device according to claim 1, wherein the dispensing device further comprises a drive mechanism that moves the plunger so that a distance between a position where the plunger is pushed downmost and a position where the plunger is pushed uppermost is in a range of 0.1 to 1,000 μm.

4. The dispensing device according to claim 1, wherein a wall thickness of the metal pipe is in a range of 5 μm to 5 mm.

5. The dispensing device according to claim 1, wherein an inner diameter of the hollow part is in a range of 0.5 to 3 mm.

6. The dispensing device according to claim 1, wherein a material of the metal pipe and a material of the plunger are different from each other.

7. The dispensing device according to claim 1, wherein the metal pipe is formed by electroforming a metal over a surface of a wire.

8. A dispensing method of dispensing a liquid sample by using a dispensing device, wherein the dispensing device comprises a metal pipe fastener, a dispensing tip that is detachably attached to the dispensing device, touches the liquid sample, and sucks or discharges the liquid sample, and a fixed plunger mount;
    wherein the dispensing tip comprises:
    a metal pipe that is formed by a metal material and has a hollow part through which the liquid sample passes;
    a plunger slidably arranged in the hollow part, and
    a screw-type plunger fastener fixed to one end of the plunger that is detachably attached to the fixed plunger mount,
    wherein the metal pipe is fixed by the metal pipe fastener, which is disposed between a distal end of the metal pipe and the screw-type plunger fastener in an axial direction of the plunger,
    wherein the metal pipe fastener is disposed around an outer surface of the metal pipe and has a diameter greater than the metal pipe,
    wherein the metal pipe has a uniform inner diameter and a uniform outer diameter, and
    wherein the plunger has a uniform diameter, and
    wherein the dispensing method comprises:
    a step of bringing the plunger included in the dispensing tip into contact with the liquid sample;
    a dispensing step of sucking or discharging the liquid sample by slidably moving the plunger in the hollow part, and
    wherein at the dispensing step, the plunger is slidably moved in a range of 0.1 to 1,000 μm.

* * * * *